United States Patent [19]

Suzuki et al.

[11] Patent Number: 4,906,686
[45] Date of Patent: Mar. 6, 1990

[54] CURABLE ORGANOPOLYSILOXANE COMPOSITION

[75] Inventors: Toshio Suzuki; Akira Kasuya, both of Chiba, Japan

[73] Assignee: Toray Silicone Company, Ltd., Tokyo, Japan

[21] Appl. No.: 290,964

[22] Filed: Dec. 28, 1988

[30] Foreign Application Priority Data

Dec. 29, 1987 [JP] Japan .................................. 62-333389

[51] Int. Cl.$^4$ ................................................ C08K 5/54
[52] U.S. Cl. ..................................... 524/730; 524/264; 524/265; 524/761; 524/762; 524/765; 524/376; 524/380; 428/447; 428/450
[58] Field of Search ............... 524/376, 380, 264, 265, 524/730, 765, 761, 762

[56] References Cited

U.S. PATENT DOCUMENTS 4,082,726  4/1978  Mine et al. .................... 260/46.5
4,087,585  5/1978  Schulz ............................ 428/429

*Primary Examiner*—Melvyn I. Marquis
*Attorney, Agent, or Firm*—George A. Grindahl

[57] ABSTRACT

The addition-curable composition of the present invention, because it comprises a special component as component (D), is characterized by an excellent bonding to any of various substrates with which it is in contact during curing. Component (D) is a mixture, or reaction product, of (a) a silicon-free compound which contains at least 1 alcoholic hydroxyl group and at least 1 alkenyl group in each molecule, and (b) an organosilane having in each molecule at least 1 alkoxy group and at least 1 epoxy or methacryloxy or acryloxy group.

4 Claims, No Drawings

CURABLE ORGANOPOLYSILOXANE COMPOSITION

BACKGROUND OF THE INVENTION

The present invention relates to an organopolysiloxane composition which cures under the effect of a platinum-type catalyst. More specifically, the present invention relates to a curable organopolysiloxane composition which bonds to a diversity of substrates.

Organopolysiloxane compositions which cure under the effect of platinum-type catalysts have long been known. Furthermore, investigations have also been conducted which have been directed at equipping such compositions with adhesive or bonding properties {refer here to Japanese Patent Publication Number 51-28309 (28,309/76), Japanese Patent Publication Number 52-48146 (48,146/77), Japanese Patent Publication Number 55-21782 (21,782/80), and Japanese Patent Application Laid Open (Kokai) Number 54-91159 (91,159/79)}.

Among these, curable organopolysiloxane compositions which include an acryloxy group- or methacryloxy group-containing organosilane {refer to Japanese Patent Publication 51-28309 (28,309/76)} or an epoxy group- and alkenyl group-containing organopolysiloxane have received notice because they exhibit adhesiveness for a variety of substrates.

However, the problem afflicting these compositions from the prior art is that they do not evidence good adhesiveness for organic substrates such as plastics, although they do present good bonding properties with respect to inorganic substrates such as glasses and metals.

BRIEF SUMMARY OF THE INVENTION

The object of the present invention is to solve this problem arising with the prior art by the introduction of a curable organopolysiloxane composition which, in addition to having good bonding properties vis-a-vis inorganic substrates, also has good bonding properties with respect to organic substrates such as plastics.

The aforesaid object is achieved by means of a curable organopolysiloxane composition characteristically comprising (A) an organopolysiloxane having at least 2 silicon-bonded alkenyl groups in each molecule; (B) an organopolysiloxane having at least 2 silicon-bonded hydrogen atoms in each molecule, in a quantity which provides a value within the range of 0.5:1 to 5:1 for the molar ratio between the silicon-bonded hydrogen atoms in component (B) and the alkenyl groups in component (A); (C) a catalytic quantity of a platinum-group catalyst; and (D) a mixture or reaction product of compounds consisting of (a) a compound which lacks silicon atoms and which contains at least 1 alcoholic hydroxyl group and at least 1 alkenyl group in each molecule, and (b) an organosilane having in each molecule at least 1 alkoxy group and at least 1 epoxy or methacryloxy or acryloxy group, in a quantity which provides a value in the range of 100:0.1 to 100:10 as the weight ratio for the ratio between the combined quantity of components (A) plus (B) and component (D).

DETAILED DESCRIPTION OF THE INVENTION

To explain the preceding in greater detail, the composition of the present invention is cured by heating or standing at room temperature, and has the property of bonding to any of a variety of substrates with which it is in contact during this curing. Each component will be explained in greater detail in the following.

Component (A) is the main component of the composition of the present invention, and curing proceeds through its addition reaction with component (B) under the activity of component (C). This component is an organopolysiloxane which has at least two silicon-bonded alkenyl groups in each molecule. The molecular configuration of this component may be any of linear, branched, cyclic, network, or three dimensional. Furthermore, while its molecular weight is not specifically restricted, it is preferred, from the standpoints of mixability with the other components and the smooth development of adhesiveness, that at least half of this component be linear or branched and that the viscosity be no more than 1,000,000 centipoise at 25° C.

The silicon-bonded alkenyl group in this component (A) is exemplified by the vinyl group, allyl group, propenyl group, butenyl group, pentenyl group, hexenyl group, heptenyl group, octenyl group, nonenyl group, and decenyl group. With regard to the location of the alkenyl groups, they are preferably present on silicon at opposing terminals from the standpoint of the reactivity in the curing reaction. The silicon-bonded organic groups other than the alkenyl groups are exemplified by alkyl groups such as methyl, ethyl, propyl, butyl, pentyl, and hexyl; aryl groups such as phenyl, tolyl, and xylyl; aralkyl groups such as benzyl and phenethyl; and haloalkyl groups such as trifluoropropyl, chloromethyl, etc. The silicon-bonded groups may also include small quantities of the hydrogen atom, hydroxyl group, and alkoxy groups. From the standpoints of economics and good bonding properties, it is preferred that methyl comprise at least half of the silicon-bonded organic groups.

Component (B) is a crosslinker for the composition of the present invention, and the composition of the present invention is cured by its reaction with component (A) under the activity of component (C). This component comprises an organopolysiloxane having at least two silicon-bonded hydrogen atoms in each molecule, and its molecular configuration and molecular weight are not restricted. The silicon-bonded organic groups are exemplified as for the organic groups in component (A), and it is preferred that methyl comprise the major fraction. Concrete examples of this component are as follows:

trimethylsiloxy-terminated polymethylhydrogensiloxanes;
trimethylsiloxy-terminated dimethylsiloxane-methylhydrogensiloxane copolymers;
dimethylhydrogensiloxy-terminated polymethylhydrogensiloxanes;
dimethylhydrogensiloxy-terminated polydimethylsiloxanes;
dimethylhydrogensiloxy-terminated dimethylsiloxane-methylhydrogensiloxane copolymers;
polymethylhydrogensiloxane cyclics;
cyclic dimethylsiloxane-methylhydrogensiloxane copolymers;
tetrakis(dimethylhydrogensiloxy)silane;
copolymers constituted of $(CH_3)_2HSiO_{\frac{1}{2}}$ units, $(CH_3)_3SiO_{\frac{1}{2}}$ units, and $SiO_2$ units; and copolymers constituted of $(CH_3)_2HSiO_{\frac{1}{2}}$ units, $(CH_3)_3SiO_{\frac{1}{2}}$ units, $CH_3SiO_{3/2}$ units, and $(CH_3)_2SiO$ units.

Component (B) is to be added in a quantity sufficient to give values within the range of 0.5:1 to 5:1 for the molar ratio between the silicon-bonded hydrogen atoms in the instant component and the alkenyl groups in component (A). Curing will be inadequate at values below 0.5:1, while the cured product will be excessively hard at values in excess of 5:1. Preferred quantities of addition will give values of 0.8:1 to 3:1 for this ratio.

Component (C) is a curing catalyst for the composition of the present invention, and comprises platinum-group metals such as platinum, rhodium, palladium, cobalt, and nickel, etc., as well as their compounds. Concrete examples in this regard are platinum/asbestos, platinum/carbon, chloroplatinic acid and its alcohol solutions, olefin complexes of platinum, alkenylsiloxane complexes of platinum, and phosphine complexes of platinum.

While the quantity of addition of this component is not specifically restricted, preferred quantities correspond to 0.1 ppm to 100 ppm as platinum or platinum-group metal based on the total quantity of component (A) plus component (B).

Component (D) is the essential component which imparts adhesiveness to the composition of the present invention. Component (D) comprises a reaction product or a mixture prepared from a component (a), a nonsilicic compound having at least one alcoholic hydroxyl group and at least one alkenyl group in each molecule, and a component (b), an organosilane having at least one epoxy group or methacryloxy group or acryloxy group and at least one alkoxy group in each molecule.

With regard to compounds comprising component (a), no specific restriction obtains on their structure as long as they do not contain the silicon atom and contain at least one alkenyl group and at least one alcoholic hydroxyl group. Their molecular weight also is not restricted. It is preferred that they be liquid at room temperature for the corresponding ease of mixing with the other components.

Concrete examples of component (a) are allyl alcohol, ethylene glycol monoallyl ether, glycerol monoallyl ether, glycerol diallyl ether, diglycerol monoallyl ether, diglycerol diallyl ether, diglycerol triallyl ether, trimethylolpropane monoallyl ether, trimethylolpropane diallyl ether, pentaerythritol monoallyl ether, pentaerythritol diallyl ether, and pentaerythritol triallyl ether.

The organosilane comprising component (b) is exemplified by the following:
3-glycidoxypropyltrimethoxysilane,
3-glycidoxypropyltriethoxysilane,
2-(3,4-epoxycyclohexyl)ethyltrimethoxysilane,
2-(3,4-epoxycyclohexyl)ethyltriethoxysilane,
3-methacryloxypropyltrimethoxysilane,
3-methacryloxypropyltriethoxysilane,
3-acryloxypropyltrimethoxysilane,
3-acryloxypropyltriethoxysilane,
methacryloxymethyltrimethoxysilane,
methacryloxymethyltriethoxysilane,
acryloxymethyltrimethoxysilane, and
acryloxymethyltriethoxysilane.

Component (D) is readily obtained by simply mixing the compound corresponding to component (a) and the organosilane comprising component (b). Furthermore, the reaction product is readily obtained by a condensation reaction (alcohol-liberating reaction) between the compound corresponding to component (a) and the compound corresponding to component (b).

This reaction is generally run at temperatures from 0° C. 200° C., under ambient or reduced pressure, and preferably with removal of the alcohol by-product. The use of a catalyst in this reaction is also recommended, for example, metal catalysts such as titanate esters and tin carboxylates, etc.; basic catalysts such as potassium hydroxide, sodium hydroxide, potassium carbonate, sodium carbonate, potassium bicarbonate, sodium bicarbonate, potassium acetate, sodium acetate, etc.; and acid catalysts such as acetic acid, trifluoroacetic acid, trifluoromethanesulfonic acid, etc. This reaction may be run in the presence or absence of solvent. Furthermore, while the mixing ratio between the compound comprising component (a) and the organosilane comprising component (b) is not specifically restricted, it will generally fall within the range of 100:1 to 1:100.

When Component (D) is added as the simple mixture without a preliminary reaction, this mixing operation may be conducted at the same time as the mixing of components (A) through (C). Also, either one of the components may be preliminarily mixed with components (A) through (C), followed by mixing of the remaining component after some time has elapsed.

The quantity of addition of Component (D) should give values within the range of 100:0.1 to 100:10 and preferably between 100:0.2 to 100:3 for the ratio between the total quantity of components (A) plus (B) and Component (D). Good bonding properties will not develop at below 0.1, while the properties of the cured composition deteriorate at values in excess of 10.

The composition of the present invention can be obtained by mixing the aforementioned components (A) through (D), but in addition to these it may also contain various additives in response to various objectives. Examples in this regard are inorganic fillers such as dry-method silica, wet-method silica, fumed silica, diatomaceous earth, silica balloons, calcium carbonate, carbon black, titanium oxide, aluminum oxide, aluminum hydroxide, zinc oxide, etc.; colorants; heat stabilizers; oxidation inhibitors; flame retardants; etc.

Furthermore, it is preferred that small quantities of acetylenic compounds, amine compounds, mercaptan compounds, phosphorus compounds, etc., be added with the objective of adjusting the rate of the crosslinking reaction. In addition, a silicone oil or solvent can be admixed for the purpose of reducing the viscosity.

Any type of kneader can be used to prepare the composition of the present invention, and examples here are planetary mixers, kneader mixers, screw mixers, impeller mixers, two-roll mixers, three-roll mixers, extruders, etc.

The composition of the present invention can be cured at room or elevated temperatures. In order to obtain a better adhesion, heating to a level of 70° to 200° C. is recommended.

The composition of the present invention bonds to numerous substances, and bonds particularly well to glasses, metals, and metal oxides. Furthermore, it presents a superior bonding to plastics compared to prior compositions. For example, it bonds well to resins such as phenolic resins, epoxy resins, polyamide resins, unsaturated polyester resins, polyethylene terephthalate, polybutylene terephthalate, polycarbonates, polyphenylene oxides, polyacetals, polyimides, etc.

Exploiting this feature, it may be used in numerous fields, such as for the adhesion, fixing, and insulation sealing of electric and electronic components; for adhesion, fixing, and gap sealing in machine parts and tools; as well for textile coatings.

Examples of the present invention are given below. In the examples, parts=weight parts and %=weight %; and the viscosity is the value measured at 25° C. Also, Me=methyl and Vi=vinyl in the formulas.

EXAMPLE 1

100 Parts dimethylvinylsiloxy-terminated polydimethylsiloxane having an average degree of polymerization (DP) of 300, 20 parts dry-method silica with a specific surface area of 200 m$^2$/g and a hexamethyldisilazane-treated surface, the reaction product of chloroplatinic acid and tetramethyldivinyldisiloxane in a quantity providing 5 ppm as platinum metal referred to the above polydimethylsiloxane, 1.8 parts trimethylsiloxy-terminated dimethylsiloxane-methylhydrogensiloxane copolymer having an average DP=10 and a SiH content=0.8% as crosslinker, and 0.01 part 3-methyl-1-butyne-3-ol were mixed to homogeneity to afford a composition A.

A curable organopolysiloxane composition was prepared by mixing 1 part 3-glycidoxypropyltrimethoxysilane and 1 part glycerol monoallyl ether into 100 parts of this composition A. This composition was subjected to adhesion testing based on JIS K 6301, with the exception that various adherends were used instead of the metal plate specified in the JIS standard. The curing conditions were one hour in an oven at 120° C. The obtained measurement values are reported in Table 1. With regard to the reference examples, the tensile adhesive strength is reported for compositions containing 2 parts glycerol monoallyl ether only (Reference Example 1) or 2 parts 3-glycidoxypropyltrimethoxysilane only (Reference Example 2).

TABLE 1

| | Adhesion, kg/cm$^2$ | | |
|---|---|---|---|
| Adherend | Exampe 1 | Reference Example 1 | Reference Example 2 |
| epoxy resin | 19 | 11 | 0 |
| phenolic resin | 31 | 13 | 12 |
| PBT resin* | 23 | 10 | 11 |
| nylon-6 | 31 | 0 | 14 |

*polybutylene terephthalate resin

EXAMPLE 2

100 Parts 3-glycidoxypropyltrimethoxysilane, 26 parts glycerol monoallyl ether, and 0.5 parts potassium carbonate were charged to a four-neck flask equipped with a stirrer, thermometer, and Liebig condenser, and were heated under a nitrogen flow. Heating was continued until methanol no longer distilled from the condenser, and the potassium carbonate was then removed by filtration. The low-boiling material was stripped by heating to 130° C./1 mmHg, thus affording a somewhat viscous transparent liquid (reaction product A). A transparent liquid (reaction product B) was also obtained by following the same reaction procedure, but using 3-methacryloxypropyltrimethoxysilane in place of the 3-glycidoxypropyltrimethoxysilane. In the reference example, a viscous transparent liquid (reaction product C) was obtained by conducting the same reaction with 3-glycidoxypropyltrimethoxysilane, but using a polysiloxane with the following average formula HO(MeViSiO)(Me$_2$SiO)$_5$H in place of the glycerol monoallyl ether.

Adhesion testing was conducted as in Example 1 on the respective preparations obtained by mixing 1 part reaction product A, B, or C into 100 parts of the composition A prepared as in Example 1. These results are reported in Table 2.

TABLE 2

| | Adhesion, kg/cm$^2$ | | |
|---|---|---|---|
| Adherend | Example 2 Reaction product A | Example 2 Reaction product B | Reference Example Reaction product C |
| epoxy resin | 22 | 20 | 12 |
| phenolic resin | 18 | 22 | 14 |
| PBT resin | 19 | 12 | 11 |
| nylon-6 | 14 | 9 | 7 |

EXAMPLE 3

1 Part 3-glycidoxypropyltrimethoxysilane was mixed into 100 parts of the composition A prepared as in Example 1, and this mixture was divided into 3 portions. Into each of the three portions was then mixed 0.5 parts trimethylolpropane diallyl ether (TMPDA) or 0.5 parts ethylene glycol monoallyl ether (EGMA) or 0.5 parts glycerol diallyl ether (GDA). The resulting preparations were then subjected to adhesion testing as in Example 1, and these results are reported in Table 3.

TABLE 3

| | Adhesion, kg/cm$^2$ | | |
|---|---|---|---|
| Adherend | Example 3 TMPDA | Example 3 EGMA | Example 3 GDA |
| epoxy resin | 26 | 36 | 32 |
| phenolic resin | 24 | 36 | 29 |
| PBT resin | 16 | 17 | 16 |
| nylon-6 | 32 | 23 | 25 |

EXAMPLE 4

A composition B was prepared by mixing the following to homogeneity: 100 parts dimethylvinylsiloxy-terminated polydimethylsiloxane with average DP=150, 20 parts dry-method silica having a specific surface area of 200 m$^2$/g and with a hexamethyldisilazane-treated surface, the reaction product of tetramethyldivinyldisiloxane and chloroplatinic acid in a quantity sufficient to afford 5 ppm as platinum metal referred to the above polydimethylsiloxane, 1 part 3-glycidoxypropyltrimethoxysilane, 0.01 part 3-methyl-1-butyne-3-ol, and 0.5 parts glycerol monoallyl ether.

To obtain curable organopolysiloxanes, each of the 3 SiH-containing polysiloxanes listed below was respectively mixed as crosslinker into this composition B, in a quantity providing a value of 1:1.5 for the molar ratio of silicon-bonded hydrogen atoms to alkenyl groups in composition B.

Crosslinker A: the crosslinker used in Example 1.
Crosslinker B: trimethylsiloxy-terminated polymethylhydrogensiloxane (average DP=40).
Crosslinker C: polysiloxane constituted of HMe$_2$SiO$_{\frac{1}{2}}$ units and SiO$_2$ units (1.6:1 molar ratio), average molecular weight=1,000.

These compositions were subjected to adhesion testing as in Example 1, and the results are reported in Table 4.

TABLE 4

| | Adhesion, kg/cm² | | |
|---|---|---|---|
| Adherend | Example 4 Crosslinker A | Example 4 Crosslinker B | Example 4 Crosslinker C |
| epoxy resin | 20 | 17 | 17 |
| phenolic resin | 22 | 21 | 22 |
| PBT resin | 21 | 12 | 9 |
| nylon-6 | 22 | 13 | 16 |

EXAMPLE 5

A curable organopolysiloxane composition was obtained by mixing the following to homogeneity: 100 parts dimethylvinylsiloxy-terminated polydimethylsiloxane with average DP=600, 20 parts dry-method silica having a specific surface area of 200 m²/g and with a hexamethyldisilazane-treated surface, the reaction product of tetramethyldivinyldisiloxane and chloroplatinic acid in a quantity sufficient to provide 5 ppm as platinum metal based on the above polydimethylsiloxane, 0.01 part 3-methyl-1-butyne-3-ol, 0.8 parts crosslinker B from Example 4, 1.5 parts acryloxymethyltrimethoxysilane, and 1 part glycerol monoallyl ether. This composition was subjected to adhesion testing as in Example 1, and the results are reported in Table 5. In the reference example, a curable organopolysiloxane composition was prepared as above, but omitting the addition of the 1 part glycerol monoallyl ether. This composition was also subjected to the same adhesion testing, and these results are reported in Table 5.

TABLE 5

| | Adhesion, kg/cm² | |
|---|---|---|
| Adherend | Example 5 | Reference Example 1 |
| steel | 35 | 20 |
| nickel | 34 | 35 |
| phenolic resin | 13 | 12 |
| PBT resin | 12 | 12 |
| nylon-6 | 13 | 6 |

That which is claimed is:
1. A curable organopolysiloxane composition comprising
   (A) an organopolysiloxane having at least 2 silicon-bonded alkenyl groups in each molecule;
   (B) an organopolysiloxane having at least 2 silicon-bonded hydrogen atoms in each molecule, in a quantity which provides a value within the range of 0.5:1 to 5:1 for the molar ratio between the silicon-bonded hydrogen atoms in component (B) and the alkenyl groups in component (A);
   (C) a catalytic quantity of a platinum-group catalyst; and
   (D) a mixture of, or a reaction product of, compounds consisting of
      (a) a compound which lacks silicon atoms and which contains at least 1 alcoholic hydroxyl group and at least 1 alkenyl group in each molecule, and
      (b) an organosilane having in each molecule at least 1 alkoxy group and at least 1 epoxy or methacryloxy or acryloxy group, in a quantity which provides a value in the range of 100:0.1 to 100:10 as the weight ratio for the ratio between the combined quantity of components (A) plus (B) and component (D).

2. A curable organopolysiloxane composition according to claim 1 wherein the compound lacking silicon atoms and containing at least one alkenyl group and at least one alcoholic hydroxyl group is selected from the group consisting of allyl ethers of glycerol, allyl ethers of trimethylolpropane and allyl ethers of ethylene glycol.

3. A curable organopolysiloxane composition according to claim 1 in which the organosilane is selected from the group consisting of 3-glycidoxypropyltrimethoxysilane, 3-methacryloxypropyltrimethoxysilane and acryloxymethyltrimethoxysilane.

4. A curable organopolysiloxane composition according to claim 1 in which the organopolysiloxane having at least 2 silicon-bonded alkenyl groups in each molecule consists substantially of a vinyl-endblocked polydimethylsiloxane having a viscosity of less than 1,000,000 centipoise at 25° C.; the organopolysiloxane having at least 2 silicon-bonded hydrogen atom in each molecule is selected from the group consisting of a trimethylsiloxy-terminated polymethylhydrogensiloxane having an average DP of 40; a polysiloxane constituted of $HMe_2SiO_{\frac{1}{2}}$ units and $SiO_2$ units in a molar ratio of 1.6:1 and having an average molecular weight of 1,000; and a trimethylsiloxy-terminated dimethylsiloxane-methylhydrogensiloxane copolymer having an average DP of 10 and an SiH content of 0.8% by weight.

* * * * *